US012656874B2

(12) United States Patent
    Kristensson et al.

(10) Patent No.: US 12,656,874 B2
(45) Date of Patent: Jun. 16, 2026

(54) VISUAL FEEDBACK FROM A USER EQUIPMENT

(71) Applicant: Telefonaktiebolaget LM Ericsson (publ), Stockholm (SE)

(72) Inventors: Andreas Kristensson, Södra Sandby (SE); Fredrik Dahlgren, Lund (SE); Alexander Hunt, Tygelsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/015,323

(22) PCT Filed: Jul. 10, 2020

(86) PCT No.: PCT/EP2020/069514
    § 371 (c)(1),
    (2) Date: Jan. 9, 2023

(87) PCT Pub. No.: WO2022/008067
    PCT Pub. Date: Jan. 13, 2022

(65) Prior Publication Data
    US 2023/0266828 A1      Aug. 24, 2023

(51) Int. Cl.
    *G06F 3/042* (2006.01)
    *G06F 3/01* (2006.01)
    (Continued)

(52) U.S. Cl.
    CPC ............ *G06F 3/017* (2013.01); *G06F 3/0304* (2013.01); *G06F 3/0421* (2013.01);
    (Continued)

(58) Field of Classification Search
    CPC ...... G06F 3/017; G06F 3/0304; G06F 3/0421; G06F 3/04817; G06F 3/04845; G06F 3/0485; G06F 2203/04806
    See application file for complete search history.

(56) References Cited

U.S. PATENT DOCUMENTS 10,088,908 B1    10/2018   Arnall et al.
10,345,911 B2     7/2019   Mongia et al.
(Continued)

FOREIGN PATENT DOCUMENTS

CN      104750238 A       1/2015
CN      106104423 A      11/2016
(Continued)

OTHER PUBLICATIONS

International Search Report and Written Opinion of the International Searching Authority, PCT/EP2020/069601, mailed Mar. 17, 2021, 10 pages.
(Continued)

*Primary Examiner* — Andrey Belousov
(74) *Attorney, Agent, or Firm* — Sage Patent Group

(57) ABSTRACT
There is provided a user equipment. The user equipment has a body. The user equipment includes at least one gesture sensor configured to, when activated, detect movement, outside the body and in at least one direction from the body, of a user interacting with the user equipment. The user equipment includes a visual user interface configured to provide visual feedback of activation of the gesture sensor. The visual feedback indicates in which at least one direction from the body the detection of movement using the gesture sensor has been activated.

19 Claims, 5 Drawing Sheets

(51) Int. Cl.

| | | |
|---|---|---|
| *G06F 3/03* | (2006.01) | |
| *G06F 3/04817* | (2022.01) | |
| *G06F 3/04845* | (2022.01) | |
| *G06F 3/0485* | (2022.01) | |

(52) U.S. Cl.
CPC ...... *G06F 3/04817* (2013.01); *G06F 3/04845* (2013.01); *G06F 3/0485* (2013.01); *G06F 2203/04806* (2013.01)

(56) References Cited

U.S. PATENT DOCUMENTS

| | | | |
|---|---|---|---|
| 10,416,785 | B2 | 9/2019 | Miyazaki et al. |
| 10,585,485 | B1 | 3/2020 | Karakotsios et al. |
| 2006/0005156 | A1 | 1/2006 | Korpipaa et al. |
| 2007/0113207 | A1 | 5/2007 | Gritton |
| 2008/0192005 | A1 | 8/2008 | Elgoyhen et al. |
| 2009/0139778 | A1 | 6/2009 | Butler et al. |
| 2010/0007518 | A1 | 1/2010 | Kang |
| 2010/0141574 | A1 | 6/2010 | Jung et al. |
| 2010/0321289 | A1 | 12/2010 | Kim et al. |
| 2011/0254792 | A1 | 10/2011 | Waters et al. |
| 2011/0320978 | A1 | 12/2011 | Horodezky et al. |
| 2012/0038542 | A1 | 2/2012 | Miyashita et al. |
| 2012/0068941 | A1 | 3/2012 | Arrasvuori et al. |
| 2012/0075202 | A1 | 3/2012 | Michaelis |
| 2012/0105346 | A1 | 5/2012 | Chen et al. |
| 2012/0144076 | A1 | 6/2012 | Kim et al. |
| 2012/0235925 | A1 | 9/2012 | Bauducco et al. |
| 2012/0306903 | A1 | 12/2012 | Griffin |
| 2014/0006830 | A1 | 1/2014 | Kamhi et al. |
| 2014/0092011 | A1 | 4/2014 | De Foras et al. |
| 2014/0111423 | A1* | 4/2014 | Park ..................... G06F 3/0393 345/156 |
| 2014/0143784 | A1 | 5/2014 | Mistry et al. |
| 2014/0152559 | A1 | 6/2014 | Chen |
| 2014/0267142 | A1 | 9/2014 | MacDougall et al. |
| 2014/0320434 | A1 | 10/2014 | Pantel |
| 2014/0375539 | A1 | 12/2014 | Gabara |
| 2016/0098137 | A1 | 4/2016 | Kim et al. |
| 2016/0224235 | A1* | 8/2016 | Forsström ........... G06F 3/04845 |
| 2016/0231835 | A1* | 8/2016 | Chen ................... G06F 3/04883 |
| 2016/0266652 | A1* | 9/2016 | Son ...................... G06F 3/0485 |
| 2016/0351047 | A1 | 12/2016 | Han et al. |
| 2017/0147125 | A1 | 5/2017 | Jiang et al. |
| 2017/0322665 | A1 | 11/2017 | Shim et al. |
| 2017/0329449 | A1 | 11/2017 | Sherry |
| 2018/0088797 | A1 | 3/2018 | McAtee et al. |
| 2018/0188894 | A1 | 7/2018 | Feinstein |
| 2018/0188943 | A1 | 7/2018 | Morita et al. |
| 2018/0239429 | A1 | 8/2018 | Agarwal et al. |
| 2020/0064996 | A1 | 2/2020 | Giusti et al. |
| 2021/0042026 | A1* | 2/2021 | Anbalagan ............. G10L 13/00 |
| 2021/0096726 | A1 | 4/2021 | Faulkner et al. |

FOREIGN PATENT DOCUMENTS

| | | |
|---|---|---|
| CO | 6920259 A2 | 4/2014 |
| EP | 2515201 A1 | 10/2012 |
| EP | 2652580 A1 | 10/2013 |
| EP | 2128748 A2 | 5/2018 |
| EP | 3343326 A2 | 7/2018 |
| JP | 2015125670 A | 7/2015 |
| JP | 2016057779 A | 4/2016 |
| KR | 2011/0078645 A | 7/2011 |
| WO | 2011088579 A1 | 7/2011 |
| WO | 2014140827 A2 | 9/2014 |
| WO | WO 2015/102974 A1 | 7/2015 |
| WO | WO 2022/008078 A1 | 1/2022 |

OTHER PUBLICATIONS

International Search Report and Written Opinion of the International Searching Authority, PCT/EP2020/069533, mailed Mar. 16, 2021, 13 pages.

International Search Report and Written Opinion of the International Searching Authority, PCT/EP2020/069514, mailed Mar. 15, 2021, 9 pages.

Goode, L., "Touchless Gesture Controls on Phones? Think Bigger," Gear, Aug. 12, 2019, https://www.wired.com/story/gesture-controls-phones-samsung-lq-google/ 12 pages.

"Infineon's innovative Xensiv™ 60 GHz radar chip enables things to see and revolutionizes the Human Machine Interface," Infineon Technologies, 2016, https://www.infineon.com/cms/en/product/promopages/60GHz/ 8 pages.

Office Action, JP Patent Application No. 2023-501204, mailed Mar. 25, 2024, 8 pages.

Office Action, IN Patent Application No. 202317002279, mailed Apr. 2, 2024, 7 pages.

Examination Report mailed Feb. 5, 2024 for Australian Patent Application No. 2020457263, 3 pages.

Office Action, Search Report Patentability Examination, Columbian Patent Application No. NC2023/0000513, mailed Dec. 2, 2025, 9 pages.

\* cited by examiner

100

130b

170

210

210

120

100

130b

170

110

200

310

D

130a1

300

120

130a2

VISUAL FEEDBACK FROM A USER EQUIPMENT

CROSS REFERENCE TO RELATED APPLICATIONS

This application is a 35 U.S.C. § 371 national stage application of PCT International Application No. PCT/EP2020/069514 filed on Jul. 10, 2020, the disclosure and content of which is incorporated by reference herein in its entirety.

TECHNICAL FIELD

Embodiments presented herein relate to a user equipment, a method, a computer program, and a computer program product for providing visual feedback from the user equipment.

BACKGROUND

Many types of user equipment, such as so-called smartphones, tablet computers, smart watches, etc. are equipped with user interfaces in terms of touchscreen displays for interaction with the user. These user interfaces are based on interaction with the user based on the user touching the display with one or several fingers, and moving the finger in a certain way, thus creating a gesture, that by the user interface can be interpreted as having a certain specific meaning.

In some applications or navigation scenarios, the touch input to the touchscreen display is limited by the actual physical size of the touchscreen display, e.g. scrolling through content that in itself is not related to size of the display. For example, for a scrolling to be exact, a common gesture is that the user moves a finger slowly at the touchscreen display and the amount of scrolling using one single gesture is commonly limited to moving a finger to the end of the touchscreen display after which the scrolling stops. For example for a scrolling to be fast, a common gesture is that the user moves the finger fast at the touchscreen display and then lifting it, causing the scrolling to be similar to rolling a wheel. Whereas the first type of scrolling is limited by being slower than the second type of scrolling, the second type of scrolling is limited by not being as exact as the first scrolling. This an more examples limit the user experience when interacting with the user interface.

Some types of user equipment are therefore equipped with one or more types of sensors, such as radar sensors, that enable gesture recognition or detection of movements in certain parts of the space surrounding the user equipment. Examples of techniques and systems that enable a smartphone-based radar system facilitating ease and accuracy of user interactions with displayed objects in an augmented-reality interface are provided in document US20200064996A1. However, also such a user equipment has drawbacks. For example, there can be an uncertainty whether a gesture has been detected, or even that the tracking is active as such.

Hence, there is still a need for means that improve the user experience for a user that interacts with the user interface of the user equipment.

SUMMARY

An object of embodiments herein is to provide means for efficient interaction with a user equipment by a user.

According to a first aspect there is presented a user equipment. The user equipment has a body. The user equipment comprises at least one gesture sensor configured to, when activated, detect movement, outside the body and in at least one direction from the body, of a user interacting with the user equipment. The user equipment comprises a visual user interface configured to provide visual feedback of activation of the gesture sensor. The visual feedback indicates in which at least one direction from the body the detection of movement using the gesture sensor has been activated.

According to a second aspect there is presented a method for providing visual feedback from a user equipment. The method being performed by a user equipment according to the first aspect. The method comprises activating the at least one gesture sensor for detecting movement, outside the body and in at least one direction from the body, of a user interacting with the user equipment. The method comprises providing visual feedback of the gesture sensor having been activated. The visual feedback indicates in which at least one direction from the body the detection of movement using the gesture sensor has been activated.

According to a third aspect there is presented a computer program for providing visual feedback from a user equipment, the computer program comprising computer program code which, when run on a user equipment according to the first aspect, causes the user equipment to perform a method according to the second aspect.

According to a fourth aspect there is presented a computer program product comprising a computer program according to the third aspect and a computer readable storage medium on which the computer program is stored. The computer readable storage medium could be a non-transitory computer readable storage medium.

Whether or not the gesture sensor has been activated is a technical condition of the user equipment. The visual feedback is an example of a visual indicator. Therefore, these aspects advantageously provide a visual indication of a technical condition of the user equipment.

Advantageously these aspects improve the user experience for a user that interacts with the user interface of the user equipment.

Advantageously these aspects provide efficient means for the user to learn that the gesture sensor has been activated.

Advantageously these aspects provide efficient means for the user to learn in what direction, or directions, movement detection as performed by the gesture sensor has been performed.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As noted above there is still a need for means that improve the user experience for a user that interacts with the user interface of the user equipment.

Further, there could be different types of ambiguities arising from situations when a user is interacting with the user interface of the user equipment. For example, it could be difficult for the user to tell as to whether movement detection (as performed by a gesture sensor) as such is active or not. For example, even if it can be confirmed that movement detection as such is active, it could be difficult to tell as to whether presence of the user has been detected (such as whether presence of a finger has been detected) or not. For example, even if it can be confirmed that the presence of the user as such has been detected, it could be difficult to tell as to whether the gesture sensor correctly has been able to interpret the movement of the user in accordance with an intended gesture or not. For example, even if it can be confirmed that movement of the user is not interpreted in accordance with an intended gesture, it could be difficult to tell as to whether such misinterpretation depends on hardware (e.g. the gesture sensor) or software (e.g., an application to which information from the gesture sensor is used as input).

The embodiments disclosed herein therefore relate to mechanisms for insert purpose. In order to obtain such mechanisms there is provided a user equipment 100, a method performed by the user equipment 100, a computer program product comprising code, for example in the form of a computer program, that when run on a user equipment 100, causes the user equipment 100 to perform the method.

Figure 1:
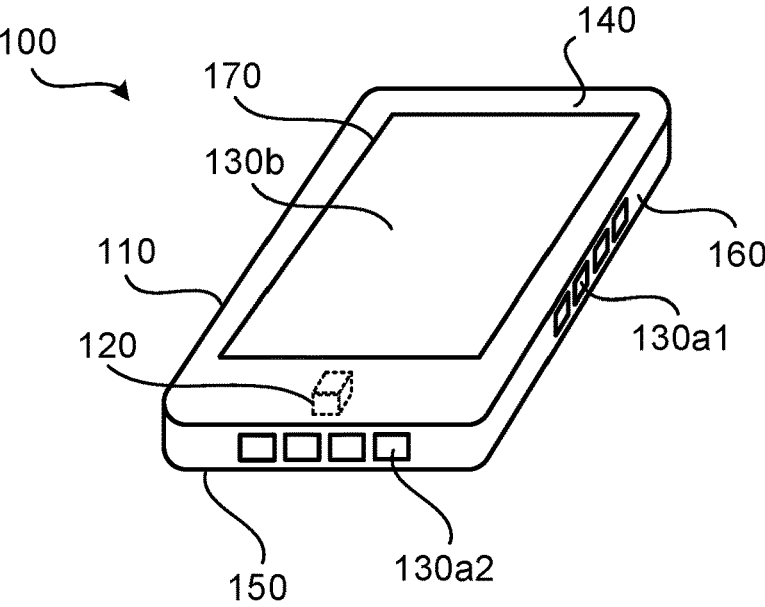
FIGS. 1 to 6 are schematic diagrams illustrating a user equipment according to embodiments.

FIG. 1 is a schematic diagram, in terms of a perspective view, illustrating a user equipment 100 according to an embodiment. Non-limiting examples of user equipment 100 are mobile phones, tablet computers, smart watches, etc.

The user equipment 100 has a body 110. The body is delimited by a top surface 140 and a bottom surface 150 and a frame 160 extending between the top surface 140 and the bottom surface 150. The user equipment comprises a touchscreen display 130*b* extending delimited by a rim, or border, 170.

The user equipment 100 comprises at least one gesture sensor 120. The at least one gesture sensor 120 is configured to, when activated, detect movement, outside the body 110 and in at least one direction from the body 110, of a user (not shown in FIG. 1) interacting with the user equipment 100. Non-limiting examples of gesture sensors 120 are proximity sensors, image sensors, radar sensors, infrared sensors, etc. Although only one gesture sensor 120 is illustrated in FIG. 1, the user equipment might be provided with two or more gesture sensors 120. These two or more gesture sensors 120 might be of the same type or might be of at least two different types.

The user equipment 100 comprises a visual user interface 130*a*1, 130*a*2, 130*b*. The visual user interface 130*a*1, 130*a*2, 130*b* is configured to provide visual feedback of activation of the gesture sensor 120. The visual feedback indicates in which at least one direction from the body 110 the detection of movement using the gesture sensor 120 has been activated. Examples of visual user interfaces 130*a*1, 130*a*2, 130*b* will be provided below.

Whether or not the gesture sensor 120 has been activated is a technical condition of the user equipment 100. The visual feedback is an example of a visual indicator. Therefore, this embodiment provides a visual indication of a technical condition of the user equipment 100.

Embodiments relating to further details of the user equipment 100 will now be disclosed.

Figure 2:
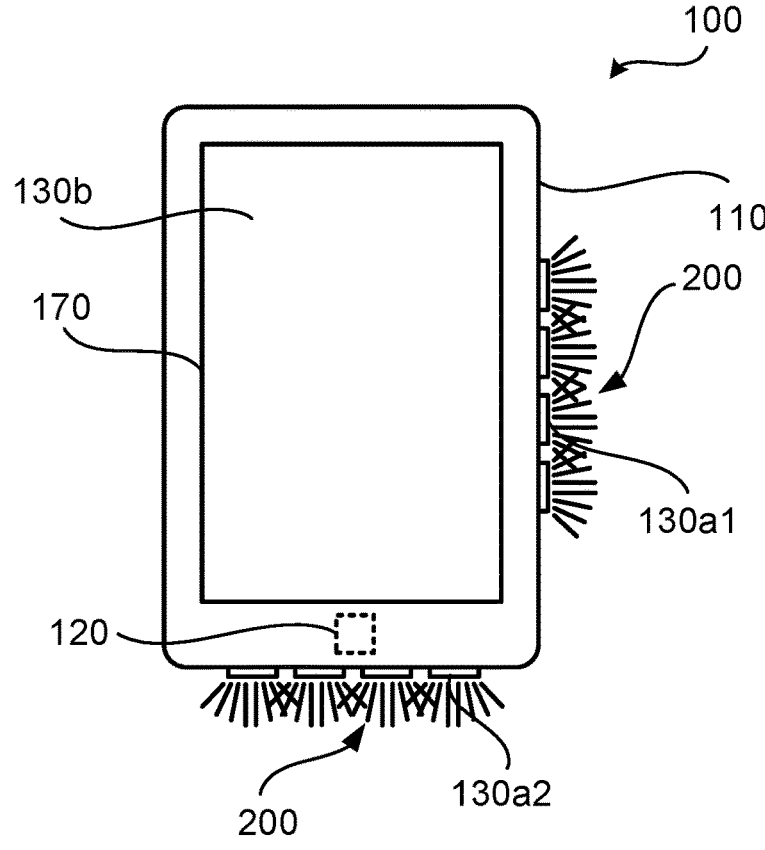

A first embodiment for providing visual feedback of activation of the gesture sensor 120 will now be disclosed with reference to the user equipment 100 of FIG. 2. FIG. 2 schematically illustrates a top view of the user equipment 100 of FIG. 1 where the visual user interface is composed of light sources 130*a*1, 130*a*2 arranged along the frame 160 in those directions in which the at least one gesture sensor 120 is configured to detect movement of the user. In the embodiment of FIG. 2, it is shown that the user equipment 100 has four such light sources, but as the skilled person understands, the user equipment 100 might have any number of such light sources 130*a*1, 130*a*2 arranged along the frame 160 in those directions in which the at least one gesture sensor 120 is configured to detect movement of the user.

In some aspects, feedback of activation of the gesture sensor 120 is provided by means of light 200 being emitted along the frame 160. Light 200 might then be emitted by the light sources 130*a*1, 130*a*2 only in this direction, or those directions, in which movement detection by the gesture sensor 120 has been activated. In particular, in some embodiments, the visual feedback is indicated by light 200 being emitted only from the light sources 130*a*1, 130*a*2 located in those directions in which the detection of movement using the gesture sensor 120 has been activated. This is advantageous since movement detection might not be activated in all directions at one time.

In some aspects, if movement detection has been activated above the top surface 140 and/or below the bottom surface 150, then light 200 might be emitted from all light sources 130*a*1, 130*a*2. That is, in some embodiments, the visual feedback is indicated by light 200 being emitted from all the light sources 130*a*1, 130*a*2 when detection of movement using the gesture sensor 120 has been activated in a direction extending perpendicularly with respect to the top surface 140 and the bottom surface 150. This is advantageous since different types of indications depending on in which direction, or directions, movement detection has been activated gives the user feedback as to in which direction, or directions, with respect to the user equipment 100 a gesture for interaction with the user equipment 100 should be performed.

Figure 3:
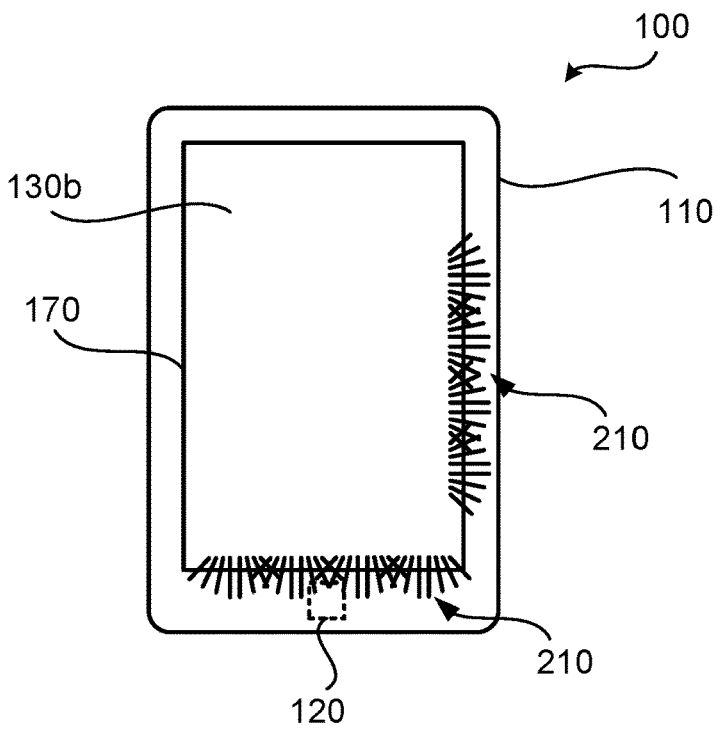

A second embodiment for providing visual feedback of activation of the gesture sensor 120 will now be disclosed with reference to the user equipment 100 of FIG. 3. FIG. 3 schematically illustrates a top view of the user equipment 100 of FIG. 1 where the visual user interface is a touchscreen display 130b. In this embodiment, the visual feedback is indicated by light 210 being emitted along the rim 170 of the touchscreen display 130b only in this direction, or those directions, in which the detection of movement using the gesture sensor 120 has been activated. This is advantageous since movement detection might not be activated in all directions at one time.

In some aspects, if movement detection has been activated above the top surface 140 and/or below the bottom surface 150, then light 210 might be along the whole rim 170.

In some aspects, visual feedback is also provided of movement of the user as detected by the gesture sensor 130. That is, in some embodiments, the visual user interface 130a1, 130a2, 130b is configured to provide further visual feedback of movement of the user 300 as detected by the gesture sensor 120. The further visual feedback indicates in which at least one direction from the body 110 the movement was detected.

Whether or not the movement has been detected by the gesture sensor 120 is a technical condition of the user equipment 100. The further visual feedback is an example of a visual indicator. Therefore, this embodiment provides a visual indication of a technical condition of the user equipment 100.

As will be further disclosed next, the visual feedback might change depending on the detected movement, gesture, position, etc. of the user.

Particularly, in some aspects, the type of visual feedback depends on in which direction movement is detected. That is, in some embodiments, which type of further visual feedback to be provided depends on in which at least one direction from the body 110 the movement was detected.

In some aspects, if movement of the user has been detected above the top surface 140 and/or below the bottom surface 150, then light 200 might be emitted from all light sources 130a1, 130a2 and/or light 210 might be emitted along the entire rim 170 of the touchscreen display 130b. In some aspects, for a movement of a user detected along a direction extending perpendicularly with respect to the top surface 140 and the bottom surface 150, the visual feedback might change (for example with respect to color and/or light intensity) as the user is moved closer to, or further away from, the user equipment 100. Further aspects of visual feedback of movement detection of the user as the user moves closer to, or further away from, the user equipment 100 will be disclosed below. The color might be shifted in accordance with a scale that could be set by the user or be hardcoded in the user equipment 100.

In some aspects, the intensity of the emitted light 200, 210 is proportional to the distance between the user equipment 100 and the detected object (e.g. a finger of the user). That is, in some embodiments, the gesture sensor 120 is configured to detect distance D (see, FIG. 6) between the gesture sensor 120 and a part 310 (such as a finger) of the user 300 (or an object, such as a stylus held by the user 300) causing the movement of the user 300 to be detected. Providing the further visual feedback then involves emitting light 200, 210 from the visual user interface 130a1, 130a2, 130b where the intensity of the light 200, 210 is proportional to the detected distance D between the gesture sensor 120 and the part 310 of the user 300.

Figure 4:
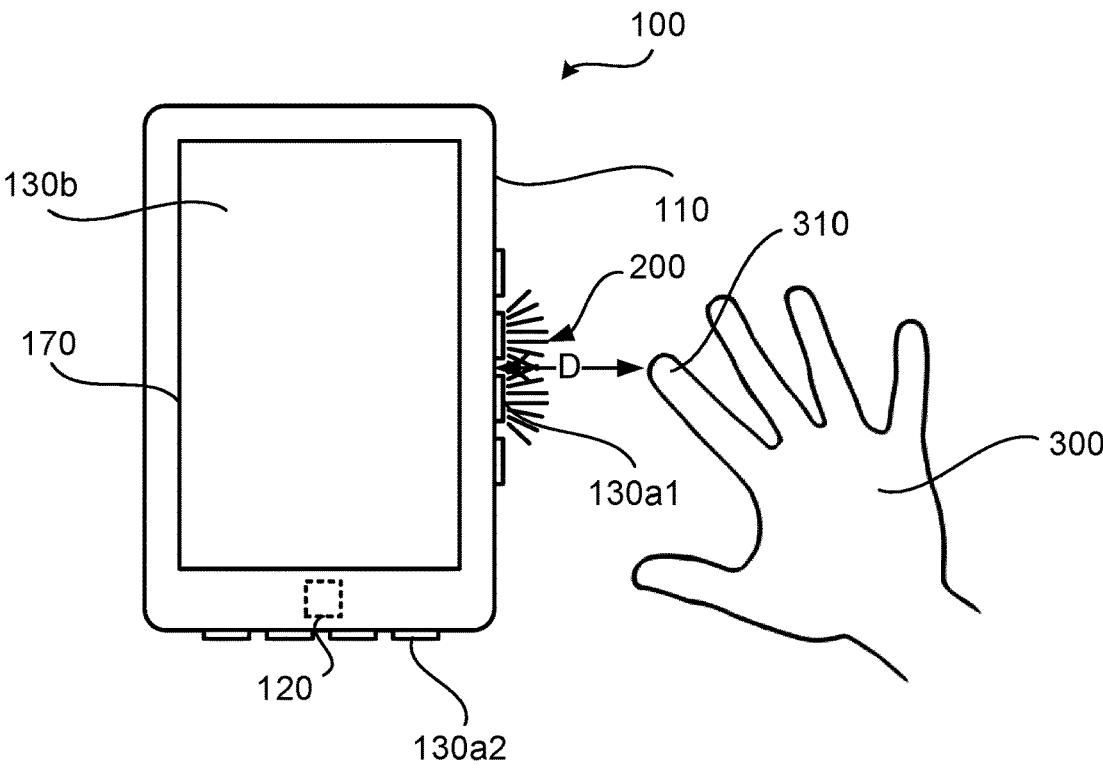

A first embodiment for providing visual feedback of movement of the user as detected by the gesture sensor 130 will now be disclosed with reference to the user equipment 100 of FIG. 4. FIG. 4 schematically illustrates a top view of the user equipment 100 of FIG. 1 where the visual user interface is composed of light sources 130a1, 130a2 arranged along the frame 160 in those directions in which the at least one gesture sensor 120 is configured to detect movement of the user. In this embodiment, it is assumed that movement of a finger 310 of the user 300 has been detected by the gesture sensor 120 in a direction from the body 110 where light source 130a1 is located. Hence, light 200 is emitted by light source 130a1 but not light sensor 130a2. In this respect, the user equipment 100 of FIG. 4 have eight light sources in total and light 200 is emitted from only those two of the light sources that are located in the direction where movement of the finger 310 has been detected. As the skilled person understands, increasing the total number of light sources 130a1, 130a2 increases the level of granularity of which visual feedback of a detected movement of the user 300 can be provided.

Further, as the finger 310 is moved closer to the user equipment 100 the intensity of the emitted light 200 might increase whereas as the finger 310 is moved further away from the user equipment 100 the intensity of the emitted light 200 might decrease, until the gesture sensor 120 no longer is able to detect movement, or the position, of the user 300. The user equipment 100 might thereby be configured to visually indicate to the user 300 that the user equipment 100 has detected movement of the finger 310.

Figure 5:
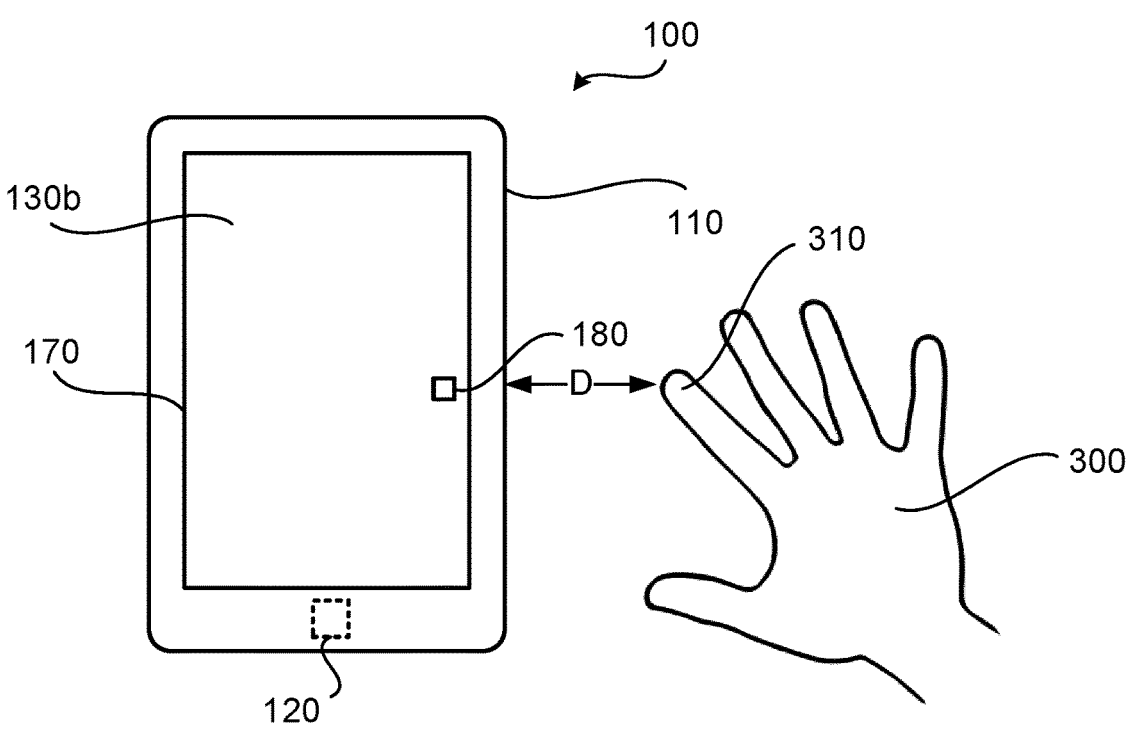

A second embodiment for providing visual feedback of movement of the user as detected by the gesture sensor 120 will now be disclosed with reference to the user equipment 100 of FIG. 5. FIG. 5 schematically illustrates a top view of the user equipment 100 of FIG. 1 where the visual user interface is a touchscreen display 130b. In this embodiment, the further visual feedback is provided as at least one icon 180 arranged on a touchscreen display 130b of the user equipment 100.

The one or more icons 180 might be displayed on the touchscreen display 130b in this direction, or those directions, where movement detection is activated and/or where movement of the user has been detected. That is, in some embodiments, the at least one icon 180 is oriented at the touchscreen display 130b so as to indicate in which at least one direction from the body 110 the movement was detected. Thus, if movement detection is activated in two or more directions from the body 110, then there might be displayed one icon 180 in each of those directions. Alternatively, as will be disclosed below, there might be displayed just a single icon 180 even though movement detection is activated in two or more directions from the body 110.

Figure 6:
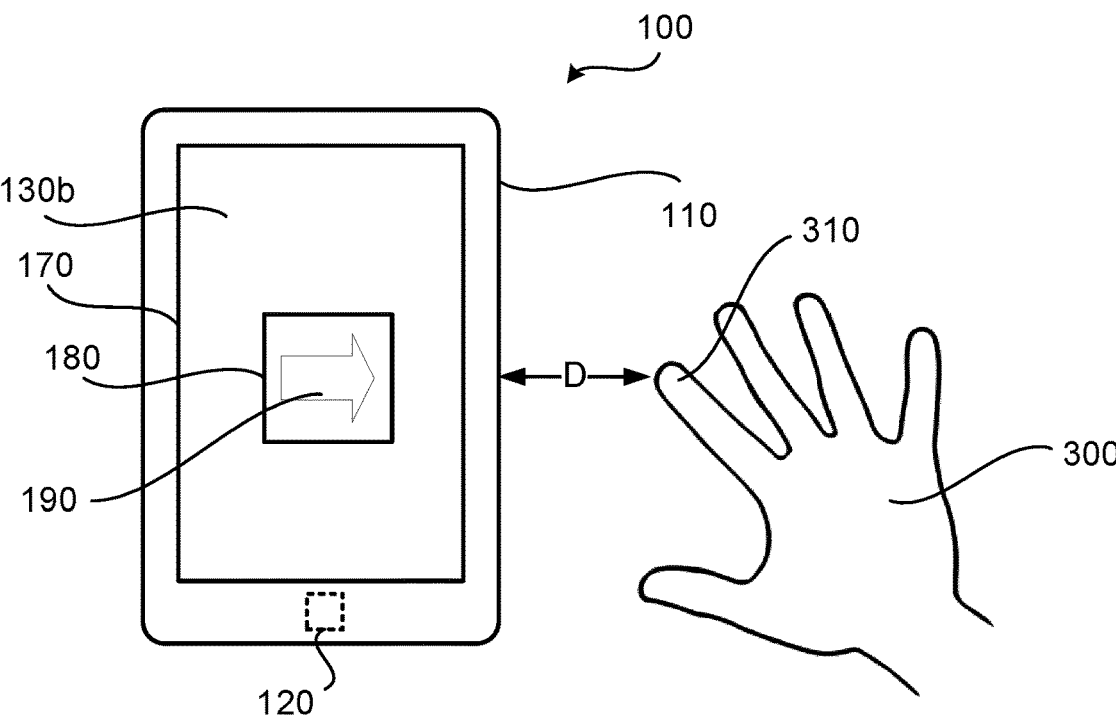

A third embodiment for providing visual feedback of movement of the user as detected by the gesture sensor 130 will now be disclosed with reference to the user equipment 100 of FIG. 6. FIG. 6 schematically illustrates a top view of the user equipment 100 of FIG. 1 where the visual user interface is a touchscreen display 130b. In this embodiment, the further visual feedback is provided as at least one icon 180 arranged on a touchscreen display 130b of the user equipment 100. This embodiment illustrates an example where the size of the one or more icons 180 is proportional to the distance D between the user equipment 100 and the detected object (e.g. the finger 310 of the user 300). That is, in some embodiments, the gesture sensor 120 is configured to detect a distance D between the gesture sensor 120 and a part 310 of the user 300 causing the movement of the user 300 to be detected, and where size of the at least one icon 180 is proportional to the detected distance D between the gesture sensor 120 and the part 310 of the user 300. Thus, as the user 300 moves closer to the user equipment 100 (and movement of the user 300 is detected by the gesture sensor 120) the icon 180 might grow in size, and vice versa as the user 300 moves away from the user equipment 100 (and movement of the user 300 is detected by the gesture sensor 120) until movement of the user 300 cannot be detected any more by the gesture sensor 120. The distance D might be a vertical distance and/or horizontal distance with respect to the user equipment 100.

In some examples, there is only one single icon 180 arranged on the touchscreen display 130b, and wherein the icon 180 comprises a visual indicator 190 of in which at least one direction from the body 110 movement detection is activated and/or in which at least one direction from the body 110 the movement was detected. In this respect, as illustrated in the embodiment of FIG. 6, only a single icon 180 is displayed, and this single icon 180 has a visual indicator 190 in the form of an arrow pointing in the directions where movement of the user 300 has been detected.

As mentioned above, the gesture sensor 120 might recognize gestures of the user 300. That is, in some embodiments, the gesture sensor 120 is configured to recognize the detected movement as a gesture for interaction of the user 300 with the user equipment 100. For example, visual feedback of a recognized gesture might be provided as a blinking of light 200, 210.

In some non-limiting examples, the gesture defines any of: a virtual touch operation, a virtual scroll operation, a virtual zoom operation. Gestures can be used by the user 300 to activate functions (e.g. virtual double-tap in the air), or a gesture to go back in menu, or others depending on application. The type of visual feedback might therefore depend on the type of recognized gesture. That is, in some embodiments, which type of the visual feedback to be provided by the visual user interface 130a1, 130a2, 130b depends on which type of gesture was detected. For example, each gesture might be associated with its own color, light blinking pattern, etc. and the visual feedback of a recognized gesture of a particular type might be provided in accordance with the color, light blinking pattern, etc. associated with that particular type of gesture. The color, light blinking pattern, etc. might be shifted in accordance with a scale that could be set by the user or be hardcoded in the user equipment 100.

Figure 7:
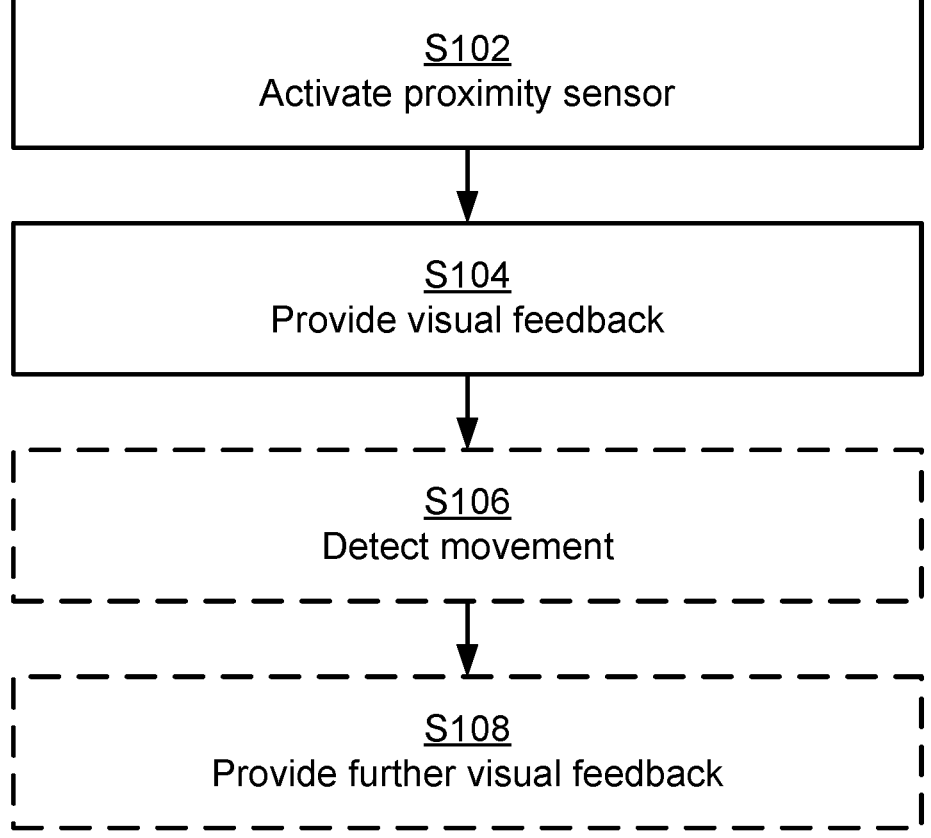
FIG. 7 is a flowchart of methods according to embodiments.

FIG. 7 is a flowchart illustrating embodiments of methods for providing visual feedback from a user equipment 100. The methods are performed by the user equipment 100 as disclosed above. The methods are advantageously provided as computer programs 1020.

S102: The user equipment 100 activates the at least one gesture sensor 120 for detecting movement, outside the body 110 and in at least one direction from the body 110, of a user 300 interacting with the user equipment 100.

S104: The user equipment 100 provides visual feedback of the gesture sensor 120 having been activated. The visual feedback indicates in which at least one direction from the body 110 the detection of movement using the gesture sensor 120 has been activated.

In this respect, the visual feedback might be provided when the user equipment 100 itself is powered on. In another example, the visual feedback is provided when an application making use of the movement detection of the user (e.g., an application using a detected gesture of the user as input) is activated.

Whether or not the gesture sensor 120 has been activated is a technical condition of the user equipment 100. The visual feedback is an example of a visual indicator. Therefore, this embodiment provides a visual indication of a technical condition of the user equipment 100.

The visual feedback can be provided in accordance with any of the above disclosed embodiments, aspects, and examples, and repeated description thereof is therefore omitted.

Embodiments relating to further details of providing visual feedback from a user equipment 100 as performed by the user equipment 100 will now be disclosed.

S106: The user equipment 100 detects movement of the user 300.

S108: The user equipment 100 provides further visual feedback indicating in which at least one direction from the body 110 the movement was detected.

Whether or not the movement has been detected by the gesture sensor 120 is a technical condition of the user equipment 100. The further visual feedback is an example of a visual indicator. Therefore, this embodiment provides a visual indication of a technical condition of the user equipment 100.

The further visual feedback can be provided in accordance with any of the above disclosed embodiments, aspects, and examples, and repeated description thereof is therefore omitted.

Figure 8:
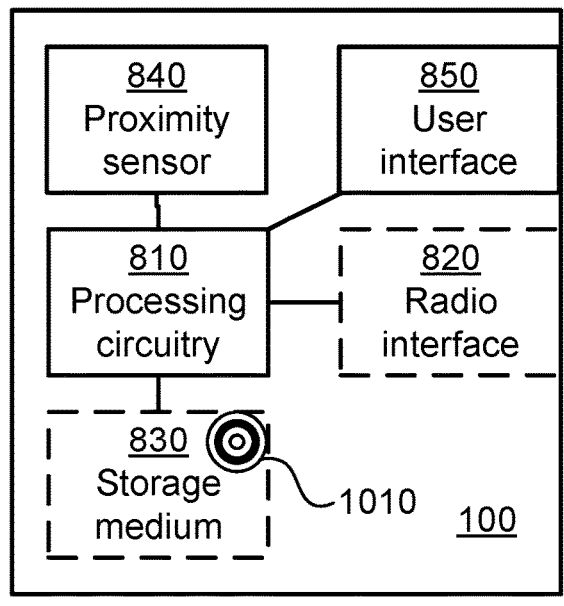
FIG. 8 is a schematic diagram showing functional units of a user equipment according to an embodiment.

FIG. 8 schematically illustrates, in terms of a number of functional units, the components of a user equipment 100 according to an embodiment. Processing circuitry 810 is provided using any combination of one or more of a suitable central processing unit (CPU), multiprocessor, microcontroller, digital signal processor (DSP), etc., capable of executing software instructions stored in a computer program product 1010 (as in FIG. 10), e.g. in the form of a storage medium 830. The processing circuitry 810 may further be provided as at least one application specific integrated circuit (ASIC), or field programmable gate array (FPGA).

Particularly, the processing circuitry 810 is configured to cause the user equipment 100 to perform a set of operations, or steps, as disclosed above. For example, the storage medium 830 may store the set of operations, and the processing circuitry 810 may be configured to retrieve the set of operations from the storage medium 830 to cause the user equipment 100 to perform the set of operations. The set of operations may be provided as a set of executable instructions. Thus the processing circuitry 810 is thereby arranged to execute methods as herein disclosed. The storage medium 830 may also comprise persistent storage, which, for example, can be any single one or combination of magnetic memory, optical memory, solid state memory or even remotely mounted memory.

The user equipment 100 may further comprise a radio interface 820 at least configured for communications with other communication entities, functions, nodes, and devices. As such the communications interface 820 may comprise one or more transmitters and receivers, comprising analogue and digital components. The user equipment 100 further comprises a gesture sensor 840 such as the gesture sensor 120. The user equipment 100 further comprises a visual user interface 850 such as light sources 130a1, 130a2 and/or a touchscreen display 130b.

The processing circuitry 810 controls the general operation of the user equipment 100 e.g. by sending data and control signals to the communications interface 820 and the storage medium 830, by receiving data and reports from the radio interface 820, the gesture sensor 840 and the visual user interface 850 and by retrieving data and instructions from the storage medium 830. Other components, as well as the related functionality, of the user equipment 100 are omitted in order not to obscure the concepts presented herein.

Figure 9:
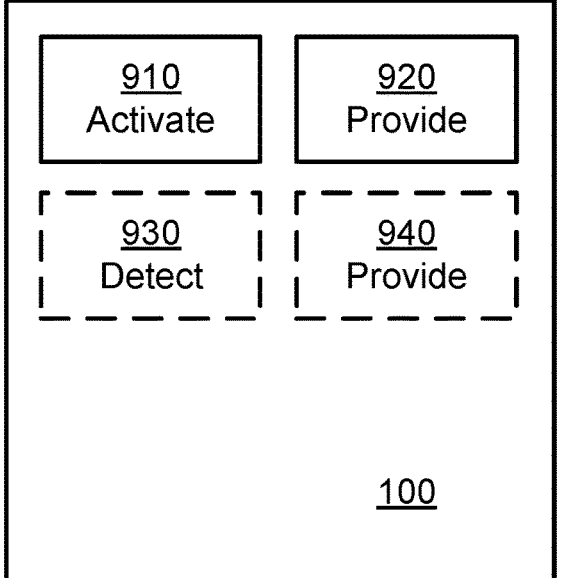
FIG. 9 is a schematic diagram showing functional modules of a user equipment according to an embodiment.

FIG. 9 schematically illustrates, in terms of a number of functional modules, the components of a user equipment 100 according to an embodiment. The user equipment 100 of FIG. 9 comprises a number of functional modules; an activate module 910 configured to perform step S102, and a provide module 920 configured to perform step S104. The user equipment 100 of FIG. 9 may further comprise a number of optional functional modules, such as any of a detect module 930 configured to perform step S106, a provide module 940 configured to perform step S108. In general terms, each functional module 910-940 may in one embodiment be implemented only in hardware and in another embodiment with the help of software, i.e., the latter embodiment having computer program instructions stored on the storage medium 830 which when run on the processing circuitry makes the user equipment 100 perform the corresponding steps mentioned above in conjunction with FIG. 9. It should also be mentioned that even though the modules correspond to parts of a computer program, they do not need to be separate modules therein, but the way in which they are implemented in software is dependent on the programming language used. Preferably, one or more or all functional modules 910-940 may be implemented by the processing circuitry 810, possibly in cooperation with the communications interface 820 and/or the storage medium 830. The processing circuitry 810 may thus be configured to from the storage medium 830 fetch instructions as provided by a functional module 910-940 and to execute these instructions, thereby performing any steps as disclosed herein.

Figure 10:
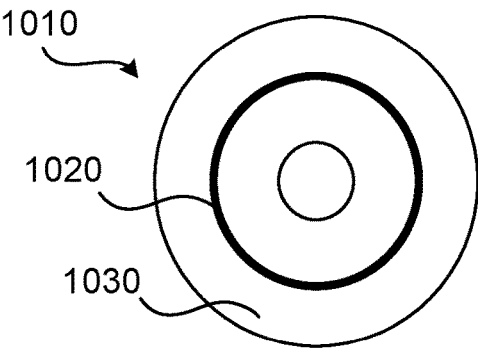
FIG. 10 shows one example of a computer program product comprising computer readable storage medium according to an embodiment.

FIG. 10 shows one example of a computer program product 1010 comprising computer readable storage medium 1030. On this computer readable storage medium 1030, a computer program 1020 can be stored, which computer program 1020 can cause the processing circuitry 810 and thereto operatively coupled entities and devices, such as the communications interface 820 and the storage medium 830, to execute methods according to embodiments described herein. The computer program 1020 and/or computer program product 1010 may thus provide means for performing any steps as herein disclosed.

In the example of FIG. 10, the computer program product 1010 is illustrated as an optical disc, such as a CD (compact disc) or a DVD (digital versatile disc) or a Blu-Ray disc. The computer program product 1010 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020 is here schematically shown as a track on the depicted optical disk, the computer program 1020 can be stored in any way which is suitable for the computer program product 1010.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A user equipment, the user equipment having a body and comprising:
   a processing circuitry;
   at least one gesture sensor coupled with the processing circuitry, the at least one gesture sensor being configured to, when activated by the processing circuitry, detect movement without physical contact to the body during tracking of a gesture formed by a user and in at least one direction relative to the body, of the user interacting with the user equipment; and
   a visual user interface coupled with the processing circuitry, the visual user interface being configured to be controlled by the processing circuitry to activate by turning-on the at least one gesture sensor and provide visual feedback of a visual indication that the at least one gesture sensor is now turned-on and which direction relative to the body of the user equipment the at least one gesture sensor is configured to detect movement, wherein the visual feedback of the visual indication is provided before the at least one gesture sensor is initially used to detect movement,
   wherein the body of the user equipment encloses the processing circuitry providing operational functionality of the user equipment, and
   wherein the body is delimited by a top surface and a bottom surface and a frame extending between the top surface and the bottom surface, and wherein the visual user interface is composed of light sources arranged along a side surface of the frame between the top surface and the bottom surface in those directions in which the at least one gesture sensor is configured to detect movement of the user, wherein the top surface is a surface that includes a display and the bottom surface is a surface that is facing in an opposite direction from the top surface, wherein the processing circuitry turns-on at least one of the light sources to emit light in the direction relative to the body of the user equipment that the at least one gesture sensor has been turned-on to detect movement.

2. The user equipment according to claim 1, wherein the visual feedback is indicated by light being emitted only from the light sources located in those directions in which the detection of movement using the at least one gesture sensor has been activated.

3. The user equipment according to claim 2, wherein the visual feedback is indicated by light being emitted from all the light sources when detection of movement using the at least one gesture sensor has been activated in a direction extending perpendicularly with respect to the top surface and the bottom surface.

4. The user equipment according to claim 1, wherein the visual user interface is a touchscreen display.

5. The user equipment according to claim 4, wherein the visual feedback is indicated by light being emitted along a rim of the touchscreen display in those directions in which the detection of movement using the at least one gesture sensor has been activated.

6. The user equipment according to claim 1, wherein the visual user interface is configured to provide further visual feedback of movement of the user as detected by the at least one gesture sensor, and wherein the further visual feedback indicates in which at least one direction from the body the movement was detected.

7. The user equipment according to claim 6, wherein which type of further visual feedback to be provided depends on in which at least one direction from the body the movement was detected.

8. The user equipment according to claim 6, wherein the at least one gesture sensor is configured to detect distance between the at least one gesture sensor and a part of the user causing the movement of the user to be detected, wherein providing the further visual feedback involves emitting light from the visual user interface, and wherein intensity of the light is proportional to the detected distance between the at least one gesture sensor and the part of the user.

9. The user equipment according to claim 6, wherein the further visual feedback is provided as at least one icon arranged on a touchscreen display of the user equipment.

10. The user equipment according to claim 9, wherein the at least one icon is oriented at the touchscreen display so as to indicate in which at least one direction from the body the movement was detected.

11. The user equipment according to claim 9, wherein the at least one gesture sensor is configured to detect a distance between the at least one gesture sensor and a part of the user causing the movement of the user to be detected, and wherein size of the at least one icon is proportional to the detected distance between the at least one gesture sensor and the part of the user.

12. The user equipment according to claim 9, wherein there is only one single icon arranged on the touchscreen display, and wherein the icon comprises a visual indicator of in which at least one direction from the body the movement was detected.

13. The user equipment according to claim 6, wherein the at least one gesture sensor is configured to recognize the detected movement as a gesture for interaction of the user with the user equipment.

14. The user equipment according to claim 13, wherein the gesture defines any of: a virtual touch operation, a virtual scroll operation, a virtual zoom operation.

15. The user equipment according to claim 13, wherein which type of the visual feedback to be provided by the visual user interface depends on which type of gesture was detected.

16. The user equipment according to claim 1, wherein the user equipment is any of: a mobile phone, a tablet computer, a smart watch.

17. The user equipment according to claim 1, wherein each at least one gesture sensor is a proximity sensor.

18. A method for providing visual feedback from a user equipment, the method being performed by a user equipment according to claim 1, the method comprising:

activating the at least one gesture sensor for detecting movement without physical contact to the body during tracking of a gesture formed by a user and in at least one direction relative to the body, of the user interacting with the user equipment; and providing visual feedback of the at least one gesture sensor having been activated, wherein the visual feedback indicates in which at least one direction from the body the detection of movement using the at least one gesture sensor has been activated, wherein the body of the user equipment encloses the processing circuitry providing operational functionality of the user equipment, and wherein the body is delimited by a top surface and a bottom surface and a frame extending between the top surface and the bottom surface, and wherein the visual user interface is composed of light sources arranged along a side surface of the frame between the top surface and the bottom surface in those directions in which the at least one gesture sensor is configured to detect movement of the user, wherein the top surface is a surface that includes a display and the bottom surface is a surface that is facing in an opposite direction from the top surface, wherein the processing circuitry turns-on at least one of the light sources to emit light in the direction relative to the body of the user equipment that the at least one gesture sensor has been turned-on to detect movement.

19. The method according to claim 18, further comprising:

detecting movement of the user; and providing further visual feedback indicating in which at least one direction from the body the movement was detected.

* * * * *